Sept. 20, 1932.  C. F. CRUMB ET AL  1,878,830
CORN HARVESTER
Filed Oct. 17, 1928  3 Sheets-Sheet 2
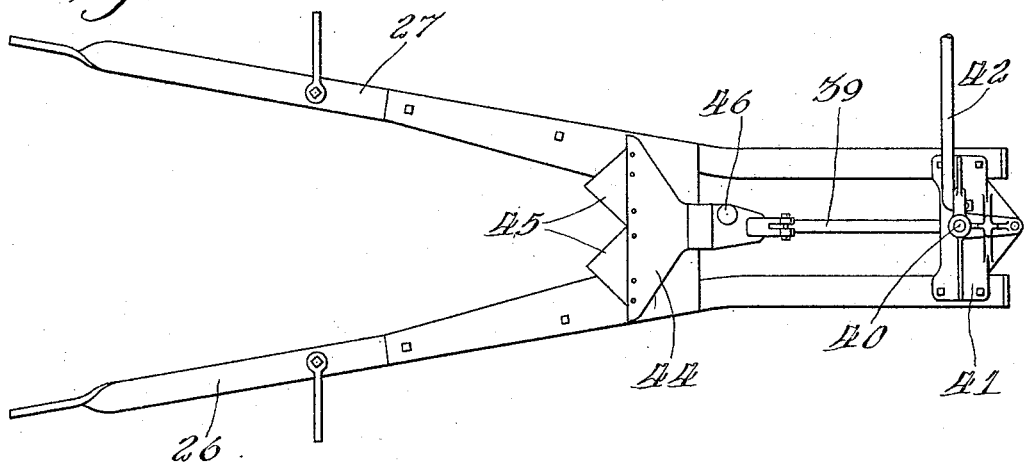
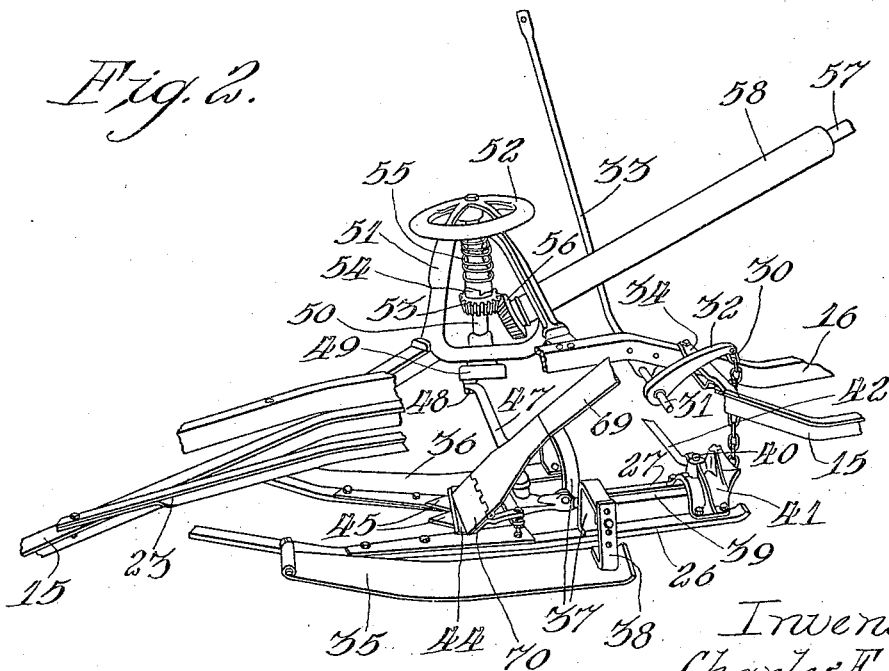

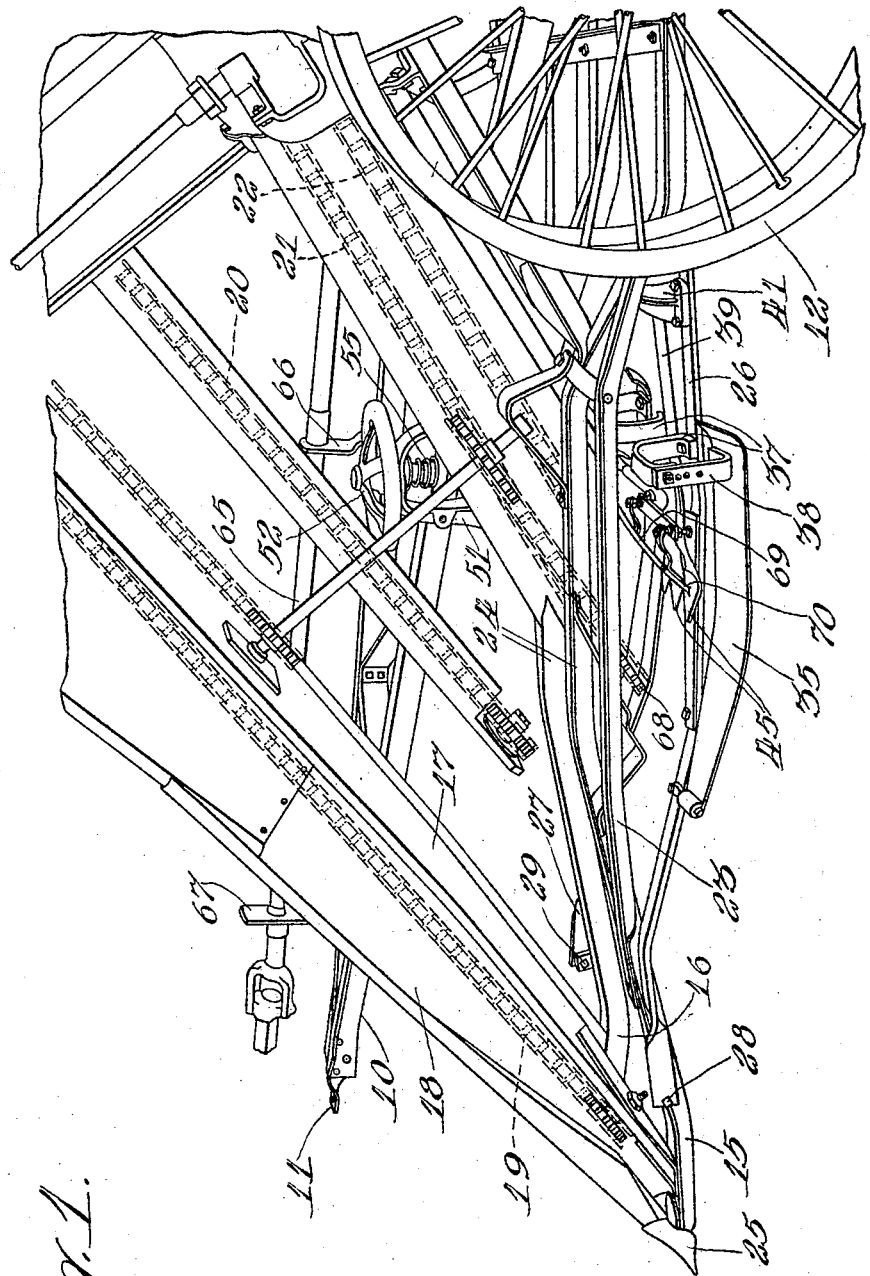

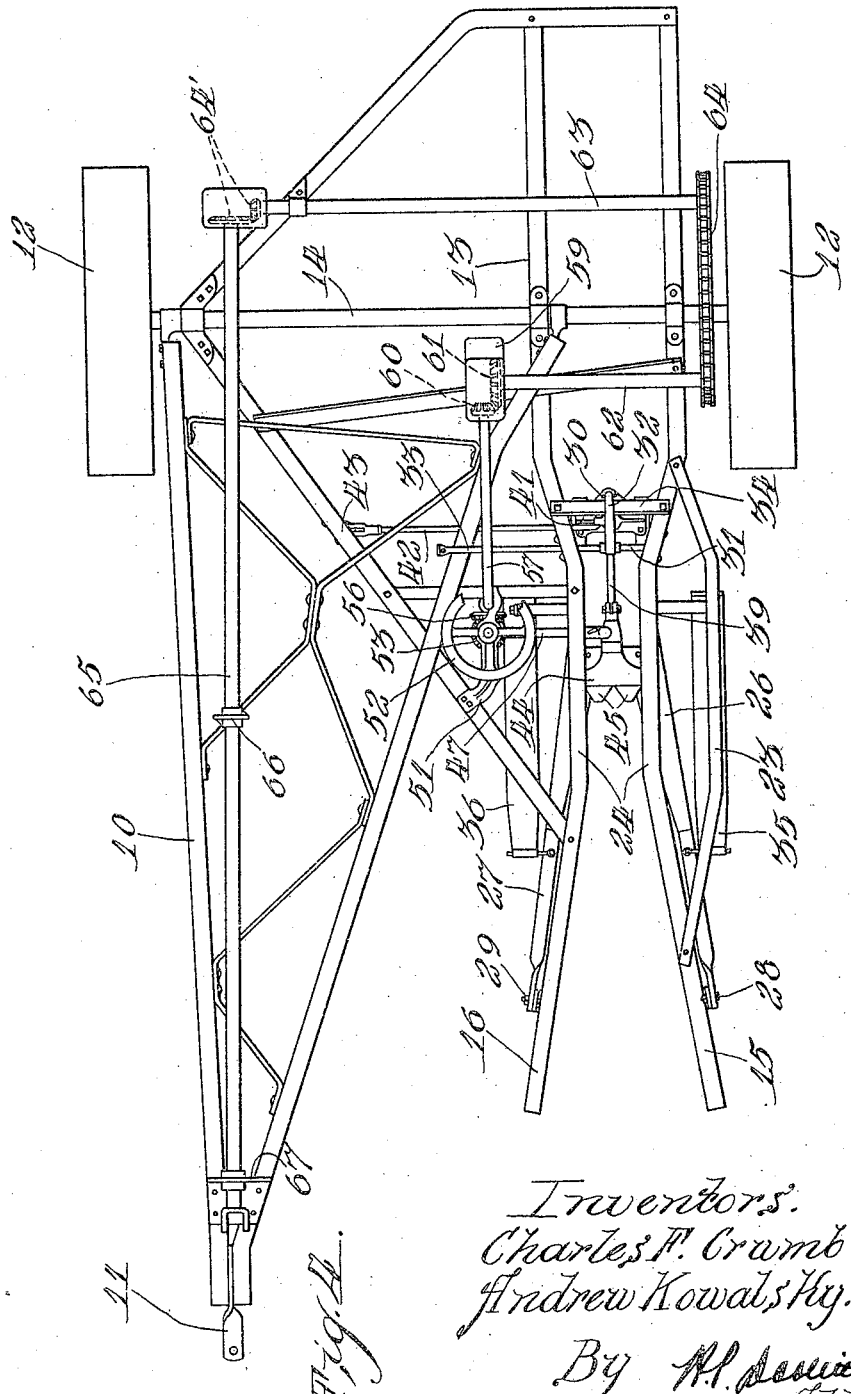

Patented Sept. 20, 1932

1,878,830

UNITED STATES PATENT OFFICE

CHARLES F. CRUMB AND ANDREW KOWALSKY, OF CHICAGO, ILLINOIS, ASSIGNORS TO INTERNATIONAL HARVESTER COMPANY, A CORPORATION OF NEW JERSEY

CORN HARVESTER

Application filed October 17, 1928. Serial No. 312,978.

This invention relates to harvesters and more particularly to corn havesters having mechanism for gathering and cutting stalks.

An object of the invention is to provide a novel form of cutting mechanism for a harvester.

Another object of the invention is to provide a harvester having a cutting mechanism which will leave practically none of the stalks above ground after the machine has traversed a row of stalks.

Other objects of the invention will appear as the following description proceeds.

An illustrative embodiment of the invention is shown in the accompanying drawings, in which:

Figure 1 is a perspective view of the harvester showing the novel arrangement of cutting mechanism and supports therefor;

Figure 2 is a detail perspective view of the cutting mechanism and its supports illustrated in Figure 1;

Figure 3 is a detail plan view of the auxiliary frame carrying the cutting mechanism; and Figure 4 is a plan view of the entire machine.

Referring to Figure 4 of the drawings, the main frame of the machine consists of a forward part 10 having a draft appliance 11 at its forward end and supporting wheels 12 at its rearward end. The rearward part 13 of the frame is mounted on the axle 14 and has forwardly extending and forwardly diverging parts 15 and 16, which are positioned beneath gathering devices including a pair of gathering boards, one of which is shown at 17. Above each gathering board is a shield 18 and an upper gathering chain 19. An intermediate gathering chain 20 and lower gathering chains 21 and 22 are provided on the machine.

The frame parts 15 and 16 have upwardly bowed or displaced portions 23 and 24. This structure permits the points 25 of the gathering devices to move along the ground substantially in contact therewith, and it also provides space within which a floating auxiliary frame may have vertical movement as it rides along the ground.

The floating auxiliary frame comprises side members 26 and 27 pivoted at their forward ends at 28 and 29 on the frame members 15 and 16, respectively. As illustrated in Figure 2 of the drawings, the members 26 and 27 are free to have vertical movements within the limits imposed by the frame members 15 and 16, and a lift mechanism comprising a chain 30, a rockshaft 31, a crank arm 32, and a hand lever 33. This lift mechanism may be used to move the floating auxiliary frame so as to free the cutting mechanism of débris which may clog that mechanism during the operation of the harvester. Downward movement of the floating auxiliary frame and the crank arm 32 is limited by reason of the fact that the crank arm encounters a stop 34, herein shown as a member joining the frame parts 15 and 16.

The floating auxiliary frame carries at its sides flat, wide, ground engaging runners 35 and 36. As shown, these runners are pivoted upon the members 26 and 27 at their forward ends and are adjustably mounted upon those members at their rearward ends by securing devices 37 and 38. This arrangement of elements enables the operator of the machine to cut stalks substantially at the ground level under different conditions.

The cutting mechanism carried by the floating auxiliary frame comprises a forwardly extending oscillating arm 39 herein shown as having an upright trunnion 40 formed at its rearward end. This trunnion is journaled in a bracket 41, which is rigidly mounted on the members 26 and 27. This bracket also acts as a journal for one end of a laterally extending stay rod 42 journaled at one end on the rearward part of the main frame at a position indicated by 43 in Figure 4 of the drawings. It acts to maintain the floating auxiliary frame in proper position transversely of the harvester during its vertical movements.

The forward end of the oscillating rod 39 carries a cutter comprising a head 44 carrying cutter sections 45 and mounting a pitman post 46. This post is rotatably received by one end of a pitman 47, the other end of which is journaled upon a crank pin 48 formed upon a crank arm or crank wheel 49 fixed upon a vertical flywheel shaft 50. This shaft is journaled in a bracket 51 secured to the main frame and it carries at its upper end a flywheel 52. It is driven by a beveled pinion 53 connected to the shaft through a slip clutch 54 normally held in driving position by a spring 55.

The pinion 53 meshes with a driving gear 56 fixed upon a driven shaft 57 which is protected by a shield 58. The shaft 57 extends into a gear casing 59 and has a pinion 60 therein meshing with a gear 61 fixed on the counter-shaft 62. This counter-shaft is driven from a main counter-shaft 63 by sprocket gearing 64. In the drawings the shaft 63 is shown as driven by gearing 64' from a main driving shaft 65, which receives power from the power take-off of a tractor. The shaft 65 is journaled in upright supports 66 and 67 secured to the main frame.

The upwardly bowed portions 23 and 24 of the frame parts 15 and 16 also provide an advantageous mounting for the sprocket of the gathering chain 21. This sprocket is shown as positioned beneath the portions 23 and 24 and located at 68, thus enabling the gathering chain 21 to operate at a sufficiently low position so as to engage the butts of the stalks and positively move them upwardly on the butt pan 69. The lower end of this butt pan is extended toward the cutter, its extreme lower end constituting a pivoted section 70 substantially in contact with the cutter head 44.

While the invention has been described with reference to a particular machine, it is to be understood that it is not limited thereto, but is rather of a scope commensurate with the scope of the sub-joined claims.

What is claimed as new is:

1. A harvester comprising, in combination, stalk gathering devices providing a stalk passage-way, a stalk cutter oscillating across the passage-way, a main frame carrying the gathering devices, a floating auxiliary frame carried by the main frame in position to drag along the ground beneath the gathering devices, means carried by the auxiliary frame to oscillatably mount the cutter thereon, and means carried by the main frame to oscillate the cutter.

2. A harvester comprising, in combination, a main frame, traversing supports carrying the main frame, stalk gathering devices carried by the main frame and providing a stalk passage-way, frame parts located beneath the gathering devices and having upwardly bowed portions, an auxiliary frame pivoted on said parts forwardly of their bowed portions so as to have up and down movements beneath said bowed portions, ground engaging runners supporting the auxiliary frame, a stalk cutter carried by the auxiliary frame so as to be operable across the passage-way, means carried by the main frame for operating the cutter, and means carried by the main frame for limiting the up and down movements of the auxiliary frame, a part of said last named means constituting a manually operable lift for the auxiliary frame.

3. A corn harvester comprising, in combination, a wheel supported main frame, stalk gathering boards carried by the main frame and providing a stalk passage therebetween, endless stalk gathering chains operable beneath the gathering boards, frame parts extending from the forward ends of the gathering boards rearwardly underneath the boards and adapted to move in close proximity to the ground, upwardly displaced portions of said parts beneath the chains, an auxiliary frame pivotally supported by said parts and movable vertically in the space from which said portions are displaced, a wheel for one of said chains journaled upon said frame parts beneath the displaced portions, a stalk cutter carried by the auxiliary frame and movable across the passage, means carried by the main frame for operating the cutter, ground engaging runners carried by the auxiliary frame for guiding the latter over the ground, and manually operable means for limiting the downward movement of the auxiliary frame and for lifting the auxiliary frame when desired.

4. A corn harvester having a main frame, an auxiliary frame floatingly connected to the main frame, a transversely movable cutter mounted on the auxiliary frame, a support for said cutter extending rearwardly and being pivoted to the auxiliary frame on a vertical axis, a driving crank mounted on the main frame, and a pitman pivotally connected to the crank and to the cutter support at a point spaced from its pivot.

5. A corn harvester having a main frame, an auxiliary frame floatingly connected to the main frame, a transversely movable cutter mounted on the auxiliary frame, a support for said cutter extending rearwardly and being pivoted to the auxiliary frame on a vertical axis, a driving crank mounted on the main frame, and a pitman pivotally connected to the crank and to the cutter support at a point spaced from its pivot and adjacent the cutter.

In testimony whereof we affix our signatures.

CHARLES F. CRUMB.
ANDREW KOWALSKY.